(12) United States Patent
Burke (10) Patent No.: US 8,163,243 B1
(45) Date of Patent: Apr. 24, 2012

(54) ZERO-G CONDENSING HEAT EXCHANGER WITH INTEGRAL DISINFECTION

(75) Inventor: Kenneth A. Burke, Chardon, OH (US)

(73) Assignee: The United States of America as represented by the Administrator of National Aeronautics and Space Adminstration, Washington, DC (US)

( * ) Notice: Subject to any disclaimer, the term of this patent is extended or adjusted under 35 U.S.C. 154(b) by 669 days.

(21) Appl. No.: 11/517,555

(22) Filed: Sep. 7, 2006

(51) Int. Cl.
*A62B 7/08* (2006.01)
*B01J 19/08* (2006.01)
*B01D 19/00* (2006.01)

(52) U.S. Cl. .............. 422/120; 422/186.07; 422/186.11; 95/261

(58) Field of Classification Search .. 422/186.07–186.2, 422/120; 95/261
See application file for complete search history.

(56) References Cited

U.S. PATENT DOCUMENTS

| | | | |
|---|---|---|---|
| 4,416,747 A | 11/1983 | Menth et al. | |
| 5,392,694 A * | 2/1995 | Muller et al. | 99/295 |
| 5,676,911 A | 10/1997 | Baumert et al. | |
| 5,855,856 A * | 1/1999 | Karlson | 422/186.11 |
| 6,036,746 A | 3/2000 | Scovazzo et al. | |
| 6,497,749 B2 | 12/2002 | Kesten et al. | |
| 6,635,104 B2 | 10/2003 | Komkova et al. | |
| 6,652,816 B2 | 11/2003 | Hwang | |
| 6,752,970 B2 | 6/2004 | Schwartz et al. | |
| 6,805,798 B2 * | 10/2004 | Kerfoot | 210/620 |
| 6,997,185 B2 * | 2/2006 | Han et al. | 128/204.17 |
| 2003/0039729 A1 * | 2/2003 | Murphy et al. | 426/320 |

* cited by examiner

*Primary Examiner* — Kevin Joyner
(74) *Attorney, Agent, or Firm* — Robert H. Earp, III (57) ABSTRACT

The system that operates in a zero gravity environment and has an integral ozone generating capability is disclosed. The system contributes to the control of metabolic water vapors in the air, and also provided disinfection of any resulting condensate within the system, as well as disinfection of the air stream that flows throughout the disclosed system.

18 Claims, 7 Drawing Sheets

ZERO-G CONDENSING HEAT EXCHANGER WITH INTEGRAL DISINFECTION

The invention described herein was made by an employee of the United States Government and may be used by or for the Government for governmental purposes without payment of any royalties thereon or therefor.

FIELD OF THE INVENTION

The invention relates to a heat exchanger. Specifically, the invention is a system that provides condensing, cooling, filtering, humidifying and disinfecting for selected environments and is particularly suited to supply life support for astronauts that includes the treatment and revitalization of the air that the astronauts breath. The system provides an ozone generator to correct for air contamination problems encountered in closed environments, such as in the space capsule or planetary outposts, but also encountered in commercial and terrestrial applications. The system improves the quality of air people breath, which has become an important health issue.

BACKGROUND OF THE INVENTION

Life support for astronauts includes the treatment and revitalization of the air that the astronauts breathe. Part of the revitalization is the removal of the excess water vapor from the air. This excess water vapor is a result of the natural metabolic production of water, and it is exhausted into the air by the astronaut's respiration and perspiration. The condensation of water in zero gravity and its separation from the remaining gaseous phase while in a zero gravity environment is technically challenging and requires a solution. In addition to the condensing and gas/liquid separation problem, there is the problem of biological fouling of the condensing/separation mechanism, being employed as part of the life support system, due to deposition and subsequent growth by microorganisms on the condensing surface of the condensing/separation mechanism. Not only does this fouling potentially reduce the effectiveness of the condenser/separator, but also represents a contamination point for the astronauts' water system.

The problem of condensing the water vapor from humidity laden air in a zero gravity environment is very similar to the problem of removing the liquid water from a two-phase fuel cell gas circulation stream. Several solutions to the fuel cell problem have been implemented and include: centrifugal separators, porous media, and membrane separators.

Centrifugal separators (both rotating and non-rotating) operate by imparting an acceleration to water droplets, and since the water drops are denser than the surrounding gas, they are "spun" separated from the gas being treated by the centrifugal separators. If the centrifugal separators are rotating, they consume power, if non-rotating their operation is flow rate dependent. The centrifugal separators are also most susceptible to dry-out conditions. However, the centrifugal separators are the least susceptible, compared to the porous media and membrane support, to fouling or plugging because the treated water does not get squeezed through tiny pathways found in porous media and membrane support devices. Scaling, that is adapting the centrifugal separators to different applications, is the most difficult of the three different type solutions.

Porous media (sintered metal, plastic or ceramic particles) operate by absorbing the condensate on a surface of interest, and by a combination of capillary forces and bulk pressure differential to transfer of water from a higher pressure gas/liquid side to a lower pressure liquid only side. The materials (sintered metal, plastic or ceramic particles) must be either inherently hydrophilic or treated to make them hydrophilic in order for a required absorption process to work. These porous media separators are considerably thicker than membrane separators, and therefore are far more resistant to water flow. This means that these separators must be sized larger, or have a greater delta P, known in the art, for driving the water through the separators than that required for membrane technique. However, the porous media technique scales easily, but unfortunately is susceptible to fouling. Furthermore, the porous media devices are generally much heavier than typical membranes, but are easily shaped into different geometries (cylindrical, planar, etc.).

Membrane separators (hydrophobic, hydrophilic, or both in combination) are very similar to the porous technique employing porous media for removing water from a two-phase fuel cell gas, but are far less flow restrictive, and therefore can be made much smaller/lighter for a given water removal rate. The membrane separator can be made to operate with low delta P. The membrane separators also scale easily, but also foul just as easily as porous media. Advantageously, the membrane separators can be made into pleated cylindrical or planar geometries. The hydrophobic type of the membrane separators operate by allowing gas to flow through the hydrophobic membrane, but not liquid. Conversely, the hydrophilic type of membrane separators allow liquid to pass, but not gas. These hydrophilic membranes are typically plastic, but sometimes are thin deposited layers of either metals, plastics or ceramics on a thicker supporting substrate. It is desired to incorporate the beneficial features of the hydrophilic membrane and centrifugal separators into a system that corrects for the problem of condensing water vapor from humidity laden air in a zero gravity environment. It is further desired to provide a system that provides purifying, condensing, filtering and humidifying functions for the Zero-G life support system for astronauts, as well as for home and office building air conditioning apparatuses, airplane air systems, automobile air systems, room humidifiers and room air cleaners.

OBJECTS OF THE INVENTION

It is an object of the present invention to provide a system for condensing, cooling, filtering, humidifying, and disinfecting selected environments, and is particularly suited for supplying life support for astronauts, including the treatment and revitalization of the air that the astronauts breathe in a zero gravity environment.

It is another object of the present invention to provide a system having an ozone generator that produces ozone at the surface of the condenser of the system, thereby disinfecting the condensed water, as well as disinfecting the air stream impacting the condensing surface.

Further, it is an object of the present invention to provide a system whereby the thermal path length between the coolant and air stream channels within the system is minimized, which, in turn, minimizes the temperature differential between the coolant and the air stream and, accordingly, improves the efficiency of the system itself.

Still further, it is an object of the present invention to provide a planar flow geometry for the air stream within the system and to provide turbulence for the flow path which assists in moving water droplets from the air being treated in a manner similar to that of a centrifugal separator, as well as removing heat from the air stream.

SUMMARY OF THE INVENTION

The invention is directed to a system for condensing, cooling, filtering, humidifying and disinfecting selected environments. The system comprises a) a cavity capable of holding water and occupied by a support screen having an upper surface; b) hydrophilic membrane arranged on the upper surface of the support screen; c) a plurality of adjacent and interconnected air channels formed in a material of relatively high thermal conductivity and relatively low density. The plurality of air channels are arranged to cover the hydrophilic membrane. The system further comprises (d) a plurality of adjacent and interconnected coolant cavities formed in the material having the relatively high thermal conductivity and the low density and arranged above the plurality of air channels; and (e) an ozone generator arranged in at least one of the air channels and located over the hydrophilic membrane.

BRIEF DESCRIPTION OF THE DRAWINGS

The features and the advantages of the invention, as well as the invention itself, will be better understood with reference to the following description when considered in conjunction with the accompanied drawings, where like reference numbers designate identical corresponding parts thereof and wherein.

DETAILED DESCRIPTION OF THE PREFERRED EMBODIMENTS

Figure 1:
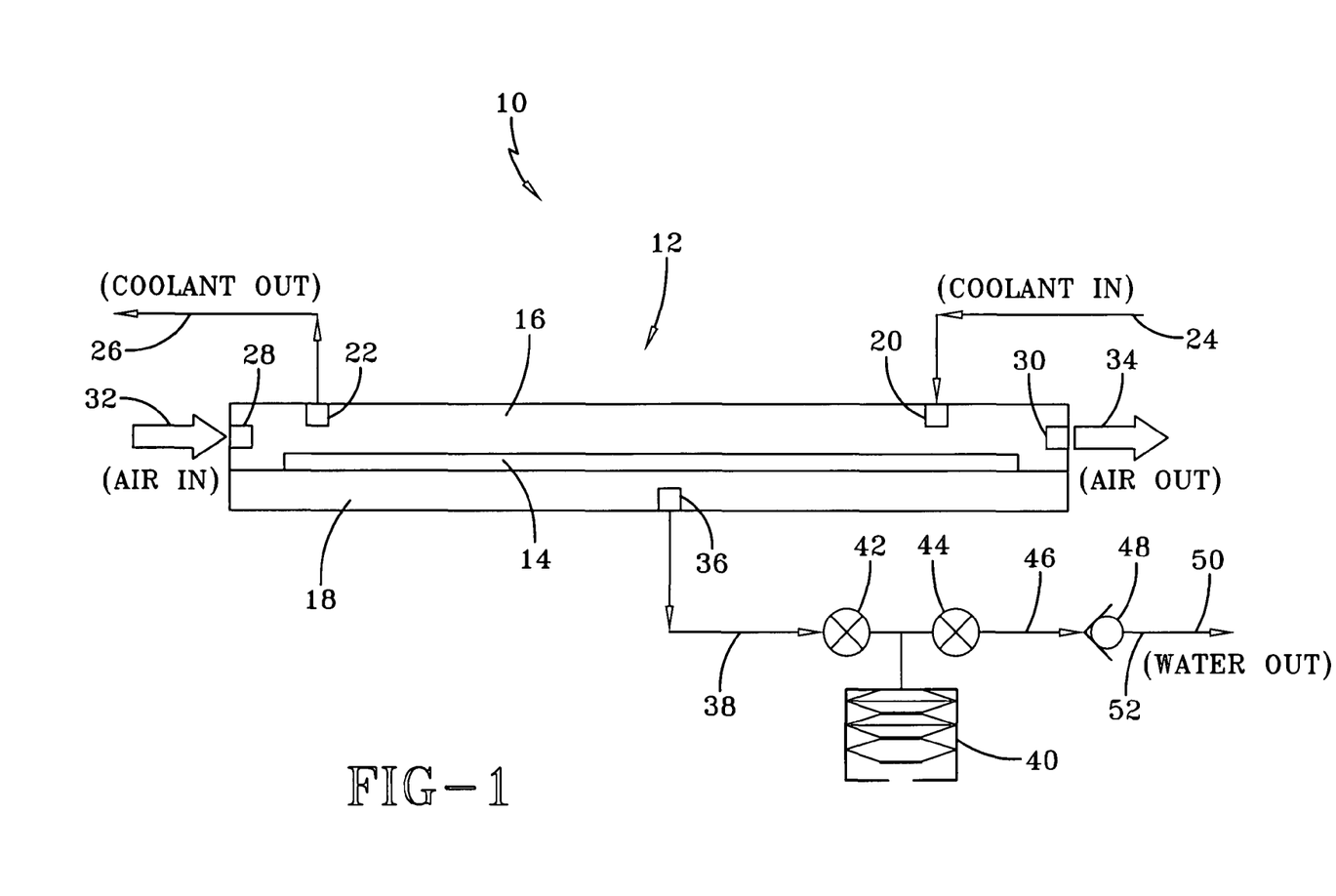
FIG. 1 is a block diagram of the system of the present invention.

Referring to FIG. 1, there is shown a block diagram of the system 10 of the present invention for condensing, cooling, filtering, humidifying, and disinfecting selected environments and is particularly suited for the treatment and revitalization of air that astronauts breathe in a zero gravity environment condition. Further, the system 10 may be advantageously utilized for a large variety of applications, such as for home and office buildings air conditioning systems, airplane air systems, automotive air systems, room humidifiers and room air cleaners. The system 10 comprises an air/water separator 12 and an ozone generator 14. The air/water separator 12 comprises an upper housing 16 and a lower housing 18.

The upper housing 16 has provisions 20 and 22, known in the art, for respectively receiving a coolant input 24 and for transporting a coolant output 26. Further, the upper housing 16 has provisions 28 and 30, known in the art, for respectively receiving air input 32 and for transporting air output 34. The lower housing 18 has provisions 36, known in the art, so as to transport and remove water therefrom along a water path or side 38.

As will be further discussed, the pressure head of the air stream within the air/water separator is relatively low. Accordingly, it is desired to provide suction on the water side 38 of the lower housing 18, so as to move condensate through the air/water separator 12 and into the water path 38. The suction may be applied by a spring loaded bellows 40. Solenoid valves 42 and 44 are preferably provided to isolate the system 10, during the filling and emptying operations of the system 10. The water path 38 passes through the solenoids 42 and 44 and into water line 46, which, in turn, passes through valve 48 onto line 50 and is shown in FIG. 1 as water out 52. The air/water separator 12 may be further described with reference to FIG. 2.

The air/water separator 12 may have any shape that conforms to the application being used. For example, for the embodiment of FIG. 2, the air/water separator 12 has a curved configuration and partially shows the upper and lower housing 16 and 18 respectively. The air/water separator 12, may be further described with reference to FIG. 3, taken along lines 3-3 of FIG. 2, and showing a cross-sectional view of the planar air/water separator 12.

Figure 3:
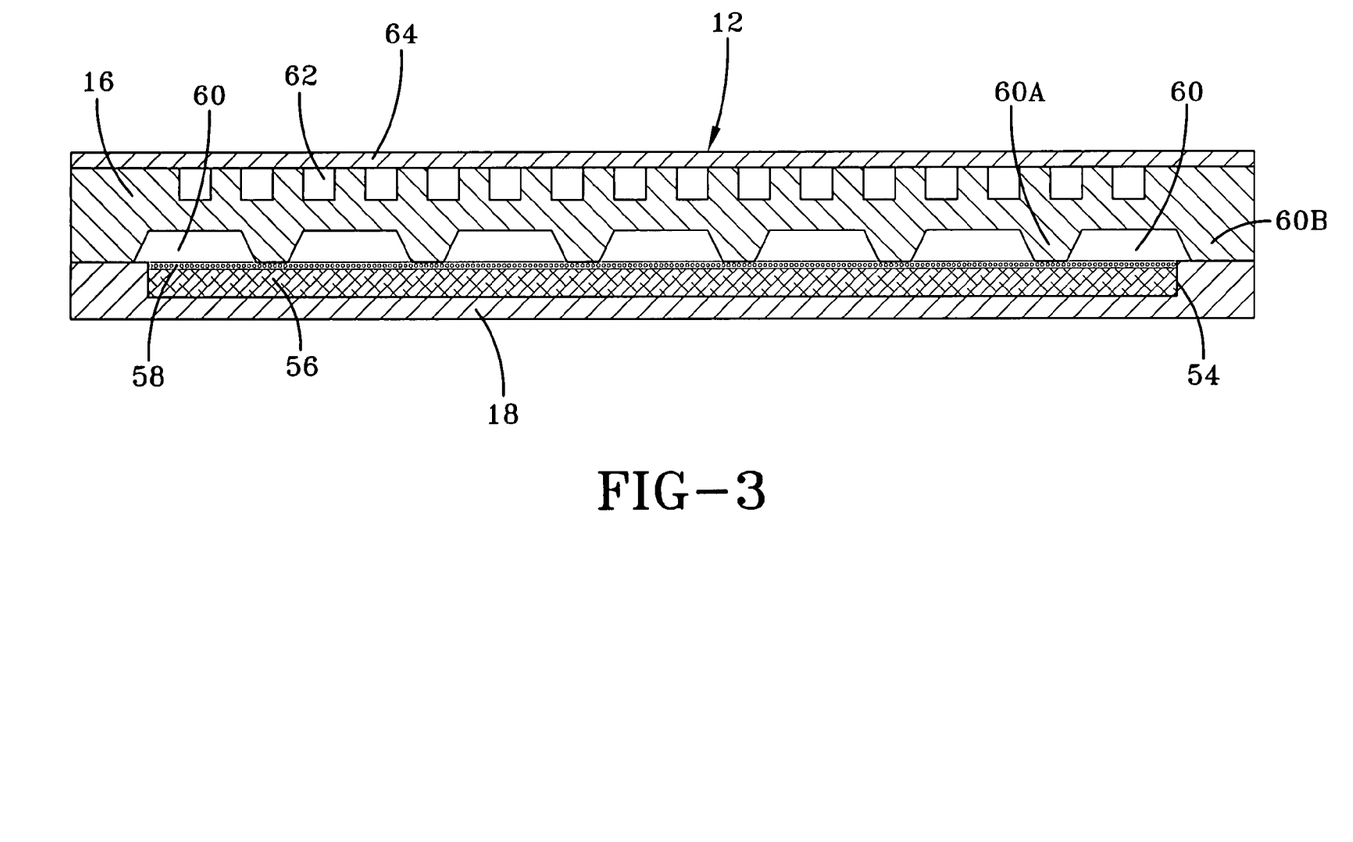
FIG. 3 is a cross-sectional, view taken along line 3-3 of FIG. 2, of the planar air/water separator.

The planar air/water separator 12 comprises a cavity 54 capable of holding water and which is occupied by a water cavity support screen 56, known in the art. A hydrophilic membrane 58 is arranged on the upper surface of the water cavity support screen 56.

The air/water separator 12, in particular, the upper housing 16 is dimensioned, so as to provide for plurality of adjacent and interconnected air channels 60 therein, all in fluid communication with each other. The plurality of air channels 60 are arranged to cover the hydrophilic membrane 58. The upper housing 16 is further dimensioned so as to provide for a plurality of adjacent and interconnected coolant cavities 62 therein, which are in fluid communication with each other. The upper housing 16 is further provided with a cover 64 that is placed over the plurality of coolant cavities 62.

The air/water separator 12 has a planar flow geometry for the air stream and is capable of being stacked or arranged, as shown in FIG. 3 in a side-by-side manner, to allow for easy scaling of the system 10. More particularly, the number of air channels 60 and coolant cavities 62 may be selected to adapt the air/water separator 12 to the air circulation requirements for the various applications, such as home and office building air conditioning systems, airplane air systems, automobile air systems, room humidifiers and room air cleaners.

The upper housing 16 is selected to be of a relatively high thermal conductive material that also has a relatively low density, so as to minimize mass. The material may be selected from the group comprising aluminum, magnesium, titanium, metal filled or carbon filled plastics, and high thermal conductivity carbon composites. Other materials can also be used wherein the properties of the materials are selected to only effect the mass and temperature of the coolant. It is not essential to the principles of the invention that only certain materials be used.

The selection of the material for the upper housing 16 allows the air stream flow in the air channels 60 to be provided with a thermal path, between the coolant in cavities 62 and the air channels 60, which is minimized or reduced, which, in turn, minimizes the temperature differential between the coolant and the air streams, so as to enhance the overall efficiency of the air/water separator 12, which, in turn, enhances the overall efficiency of the system 10. The upper housing 16 acts essentially as a liquid/air heat exchanger. The hydrophilic membrane 58, located below the air channels 60, may be further described with reference to FIG. 4.

Figure 2:
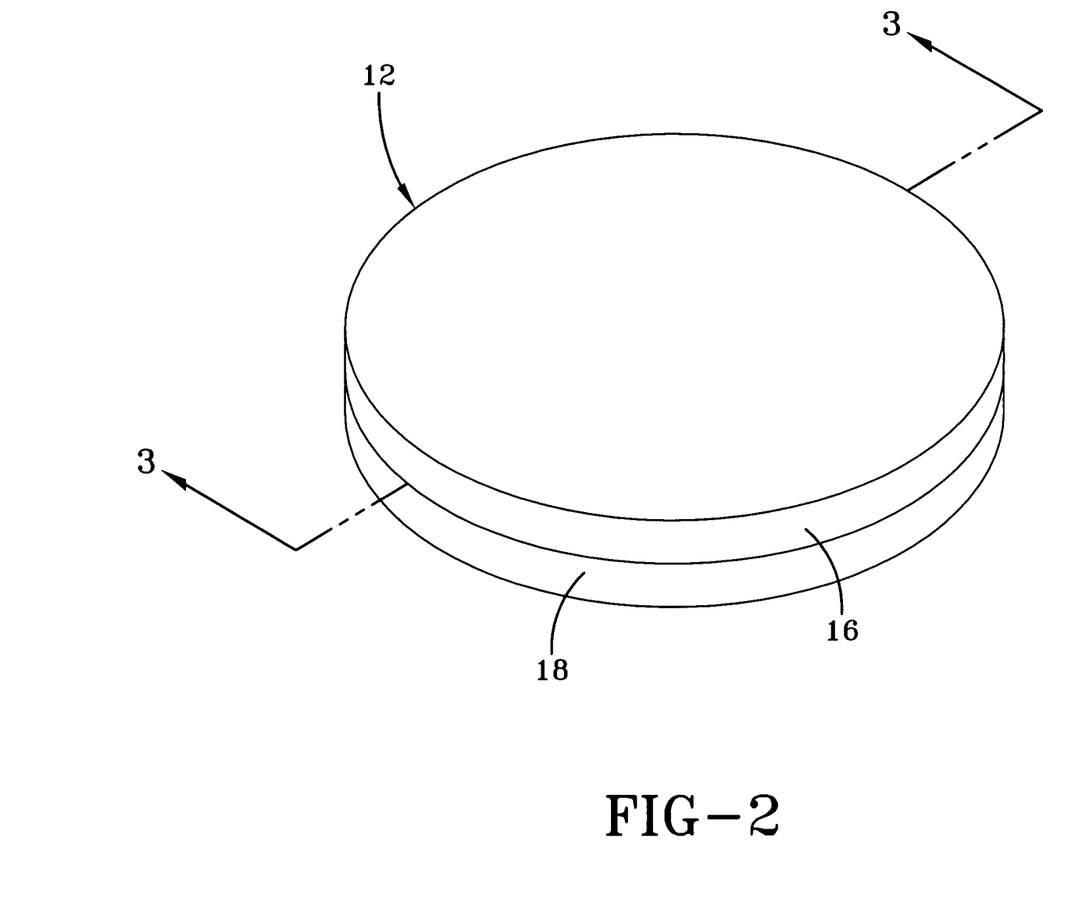
FIG. 2 illustrates one embodiment of the present invention being a circular arrangement of the planar air/water separator of the system of the present invention.
Figure 4:
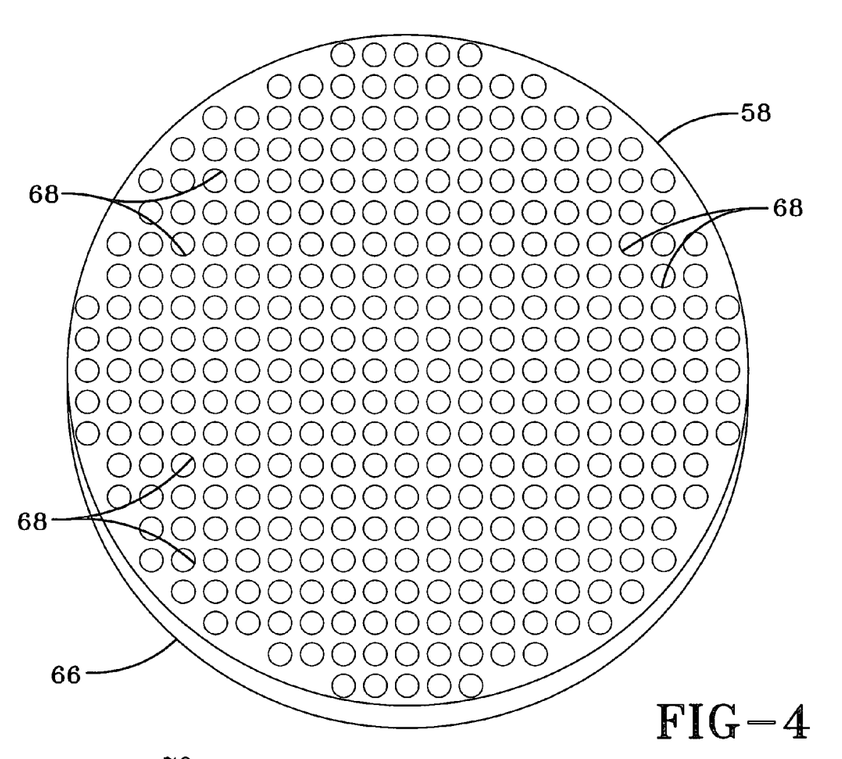
FIG. 4 illustrates the hydrophilic membrane of the present invention.

FIG. 4 shows the hydrophilic membrane 58 as having a circular shape, microscopic-sized accommodating the embodiment of FIG. 2, a thickness 66 and a plurality of microscopic-sized pores 68. The pores 68 are shown in FIG. 4 as being circular for the sake of clarity, but in actuality the pores 68 are irregular shaped and act as passageways through a tangled web of polymer fibers that are also highly irregular in shape. The hydrophilic membrane 58 is commercially available and its pores size is selected to minimize the pressure drop of water transported through the hydrophilic membrane 58, yet has a sufficient bubble pressure to provide robust resistance to gas flow through the membrane 58. The hydrophilic membrane 58 may be of a plastic material having a thickness 66 of 0.0052 inches, and having a nominal pore size rating of $0.8\mu$. The selection of hydrophilic membrane 58 allows for minimization of both size and mass. The plastic hydrophilic membrane 58 also has a bubble point, given in pounds/square inch differential psid, of about 15. The benefits of the plastic hydrophilic membrane 58 relative to a prior art stainless steel membrane may be further described with reference to FIG. 5.

Figure 5:
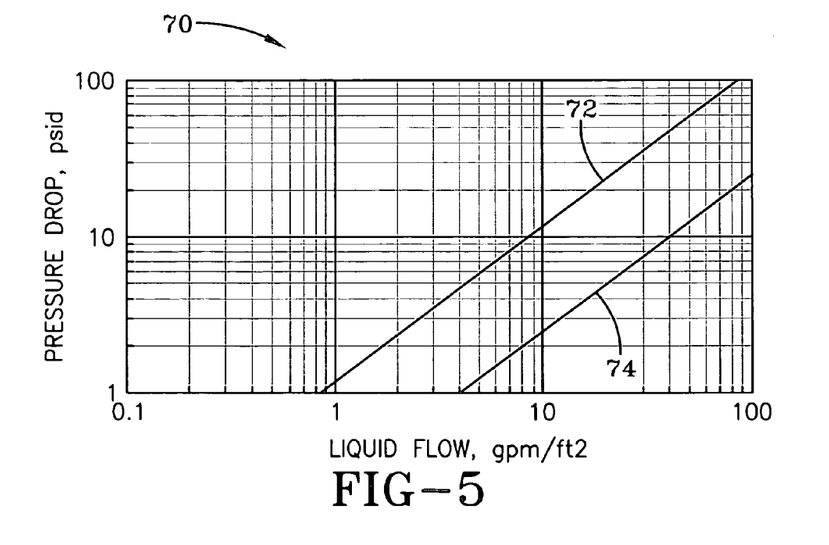
FIG. 5 illustrates a family of curves showing, among other things, a pressure drop liquid flow characteristic of the hydrophilic membrane of FIG. 4.

FIG. 5 shows a family of curves 70 illustrating the response of a stainless steel sinter membrane and a plastic membrane of the liquid flow, given in gallons per minute per square foot ($gpm/ft^2$), vs. pressure drop common given in psid. The family of curves 70 include responses 72 and 74, which are respectively those of a stainless steel sinter membrane and the plastic membrane 58. The stainless steel sinter is of a medium grade: $0.2\mu$, has a thickness of 0.039 inches, and a bubble point, given in inches of mercury (in Hg) of 5-6.9. A comparison between the two responses 72 and 74 reveals that the plastic membrane 58 of response 74 offers greater flow at the same delta P or less delta P at the same flow. Delta P is the pressure difference between two sides of the membrane 58. Delta P is sometimes referred to as differential pressure. Further, the plastic membrane associated with response 74 is thinner, lighter and has a much higher bubble pressure relative to the stainless steel sinter membrane related to response 72. The plastic membrane 58 may be used in condensing heat exchangers and in air conditioners of any capacity. The air/water separator 12 housing the plastic hydrophilic membrane 58, may be further described with reference to FIG. 6, which is a cut-away view of the planar air/water separator 12.

Figure 6:
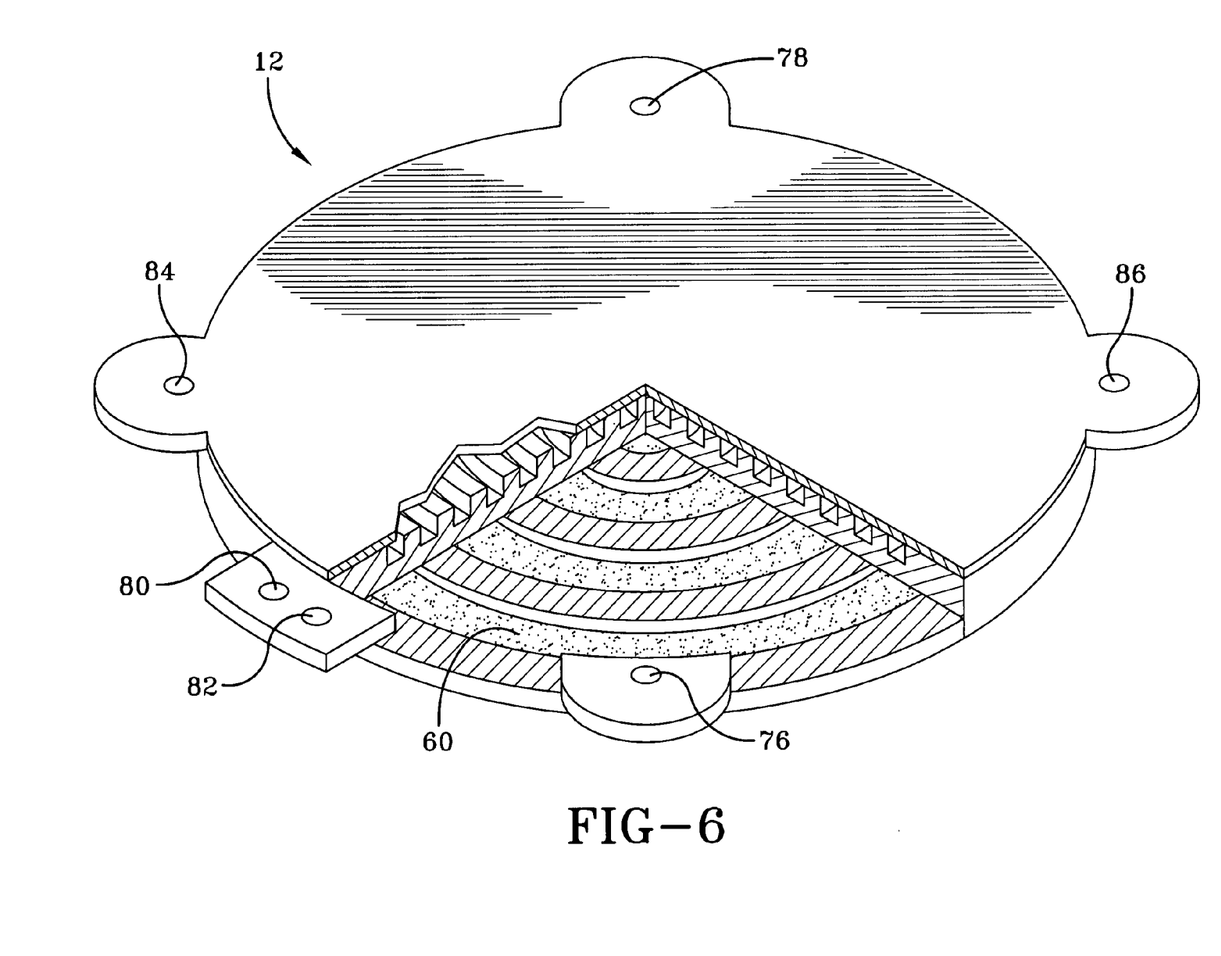
FIG. 6 is cut-way view of the planar air/water separator of the present invention.

FIG. 6 shows input and output manifolds 76 and 78, which are part of the provisions 20 and 22, previously mentioned with reference to FIG. 1, input and output manifolds 80 and 82, which are part of the provisions 28 and 30, previously mentioned with reference to FIG. 1, and common water manifolds 84 and 86, which are part of the provisions 36, previously mentioned with reference to FIG. 1.

FIG. 6 also illustrates the plurality of adjacent and interconnected coolant cavities 62, all having fluid communication therebetween and arranged in a side by side manner.

Further, FIG. 6 illustrates, for one embodiment, a spiral pattern of the air channels 60, all interconnected to provide communication therebetween. The spiral pattern creates radial acceleration of the air flow that assists in the separation of the water droplets from the air flow, to be further described hereinafter. Some of the benefits provided by the air/water separator 12, may be further described with reference to FIG. 7, which is a cross-sectional view of the planar air/water separator 12.

Figure 7:
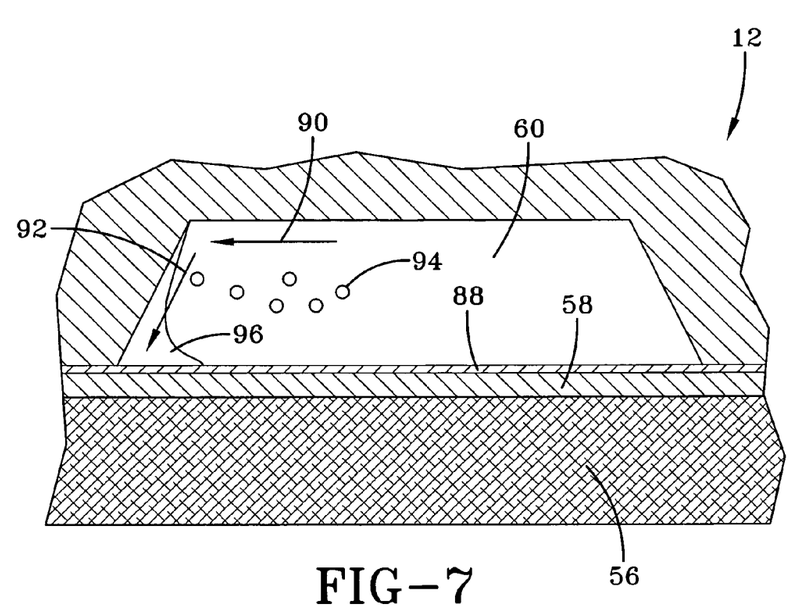
FIG. 7 is a cross-sectional view of the planar air/water separator of the present invention, particularly showing one of the features of the present invention of water droplets being spun outward and toward the hydrophilic membrane of the present invention.

FIG. 7 illustrates, in a general outline, one of the air cavities 60, which is positioned over part of the hydrophilic membrane 58, which has a film 88 thereon. FIG. 7 further illustrates a horizontal directional arrow 90, and a vertical directional arrow 92, both of arrows 90 and 92 being associated with a plurality of water droplets 94.

As seen in FIG. 7, the water droplets 94 are "spun" outward, as indicated by directional arrow 90 and toward, as indicated by directional arrow 92, the hydrophilic membrane 58 resulting in a peaked shape fluid portion 96, shown in FIG. 7.

The air channels 60 provide changes in a direction of the flow path within the air channels 60 that imparts acceleration, which assists in separating water droplets 94, as shown in FIG. 7. Changes in the width and depth of the air channels 60, known in the art to create turbulence, also imparts acceleration which assists in separating water droplets 94. The separation is accomplished while minimizing the difference between the air inlet pressure and air outlet pressure. The imparted accelerations assist in moving the water droplets 94 to the surface of the hydrophilic membrane 58, in particular, to the film 88 and into the peaked portion 96. The turbulence in the air channels 60 also enhances heat transport from the air in the air channels to the cooled walls of the coolant cavities 62. A further benefit of the system 10, in particular, the ozone generator 14, may be further described with reference to FIG. 8, which is a cross-sectional view of the planar air or water separator 12.

Figure 8:
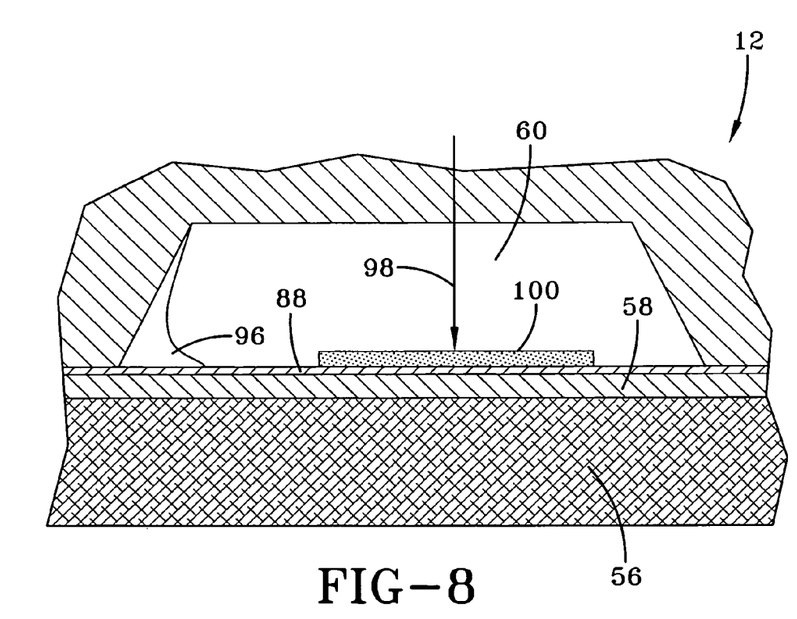
FIG. 8 is a cross-sectional view of the planar air/water separator of the present invention, illustrating an ozone layer generated by the ozone generator of the present invention that eliminates the biological growth on the hydrophilic membrane of the present invention so as to disinfect the condensate and purifying the air stream with the system of the present invention.

FIG. 8 is similar to FIG. 7, with the exception that the directional arrows 90 and 92 are removed, as well as the water droplets 94 not being present, but rather a directional arrow 98, is shown in FIG. 8, in contact with a layer of ozone 100 which, in turn, is in contact with the film 88. An ozone generator, such as an electrochemical ozone generator 14, to be further described with reference to FIG. 9, generates an ozone layer 100, which prevents biological growth on the hydrophilic membrane 58, while also disinfecting the condensate, as well as disinfecting and purifying the air stream flowing with the plurality of air channels 60. The electrochemical ozone generator 14, may be further described with reference to FIG. 9, which is cross-sectional view of the ozone generator 14 of FIG. 1.

Figure 9:
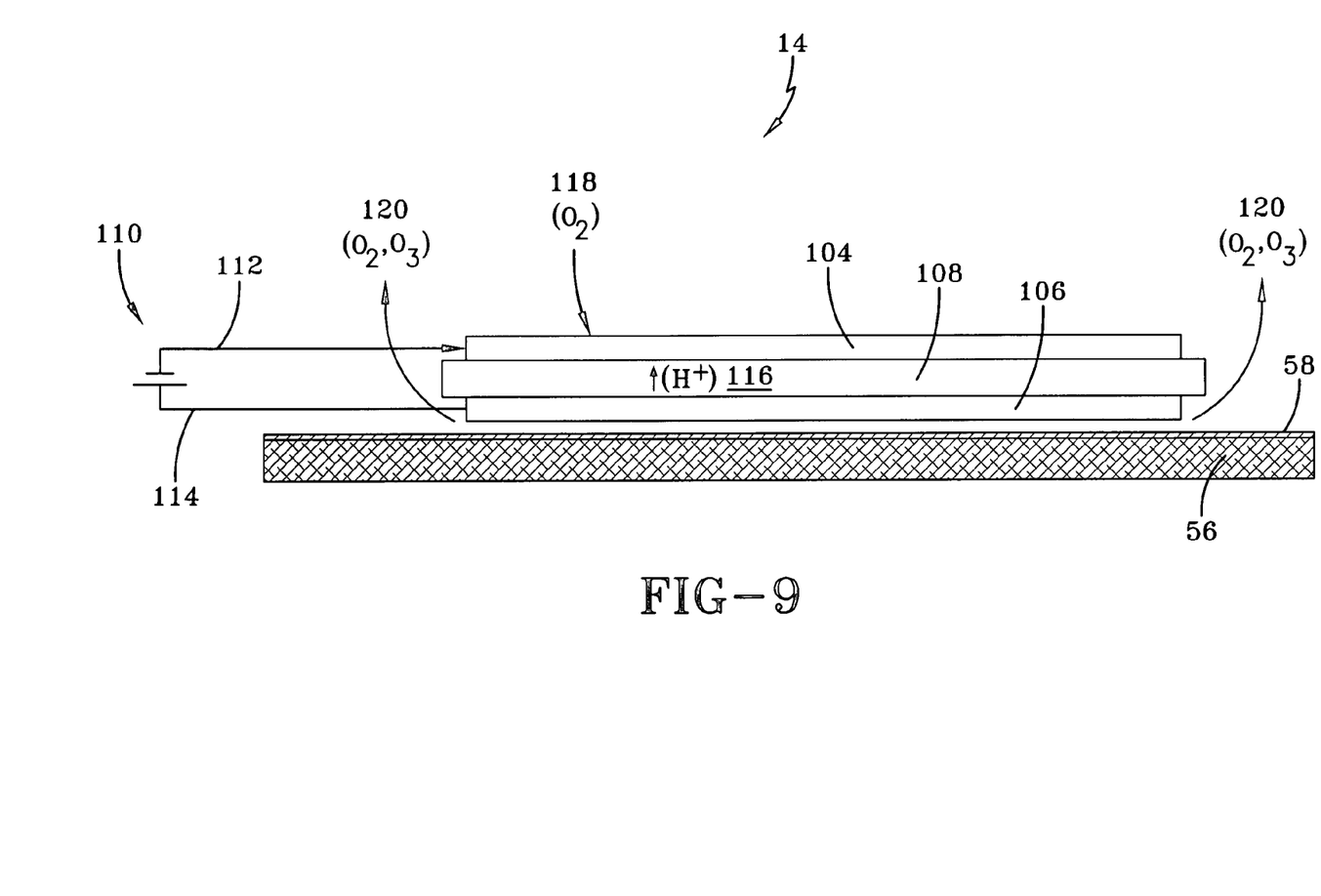
FIG. 9 is a cross-sectional view of the electrochemical ozone generator of the present invention.

Under normal operating conditions, the air/water separator 12, more particularly, air stream flowing in air channels 60 will likely contain microscopic particle matter, as well as biological contamination that would otherwise foul the air/water separator 12. The electrochemical ozone generator 14 of FIG. 9, provides the anti-fouling correction. The electrochemical ozone generator 14 performs an electrolytic process in which electrical energy is applied to cause a chemical change, similar in a manner as described in U.S. Pat. No. 4,416,747 ('747), which is herein incorporated by reference in its entirety.

FIG. 9 illustrates a electrochemical ozone generator 14 comprised of a cathode 104, an anode 106, and an ion exchange membrane 108 interposed between and separating the cathode 104 and the anode 106. The cathode and the anode 104 and 106 respectively, are connected to an electrical source 110. More particularly, the cathode 104 is connected to the negative potential 112 of the electrical source 110, whereas the anode 106 is connected to the positive potential 114 of the electrical source 110.

The cathode 104, anode 106, and ion exchange membrane 108 are dimensioned, so as to fit into at least one of the air channels 60 (not shown) and cover a portion of the plastic hydrophilic membrane 58. The anode 106 and cathode 104 are preferably made of stainless steel, and the ion exchange membrane 108 is preferably made of a plastic polymer based on perfluorinated sulphonic acids. The ion exchange membrane 108 may be coated on the cathode side with a layer of a mixture of 85% by weight carbon powder and 15% by weight platinum powder. The anode side of the ion exchange membrane 108 may be coated with PbO2 powder. A ion generator 14 causes ozone to be produced in the solution on the anode side of the ion exchange membrane 108, while water is formed on the cathode side thereof. The H+, which is produced on the anode side by the decomposition of water to form oxygen and ozone ($O_2$, $O_3$) 120, shown in FIG. 9, migrates through the ion exchange membrane 108 and reacts with oxygen in the water on the cathode side to form water.

The electrochemical ozone generator 14 generates anode and cathode reactions given below:

Anode Reaction(s)

$$3H_2O \rightarrow O_3(g) + 6e^- + 6H^+$$

$$O_2 + H_2O \rightarrow O_3(aq) + 2e^- + 2H^+$$

$$2H_2O \rightarrow O_2 + 4e^- + 4H^+$$

Cathode Reaction $$O_2 + 4e^- + 4H^+ \rightarrow 2H_2O$$

In operation, the hydrophilic membrane 58 providing a condensing separating surface together with an in-situ electrochemical generation of ozone 14 at the condenser surface, which provides for disinfection of the air stream traveling in air channels 60. In the operation of system 10, the hydrophilic membrane 58 is cooled below the ambient dewpoint by a coolant flowing in the coolant cavities 62 and made available from a coolant source.

The moisture laden ambient air impacting the surface of hydrophilic membrane 58, in particular film 88, condenses water on the surface of the hydrophilic membrane 58. This water is soaked up through the hydrophilic membrane 58 and transported through the hydrophilic membrane 58, as well as through the screen 56, and into the water line 38 leaving the air/water separator 12.

During the above process, the electrochemical ozone generator 14 located on the air side of the hydrophilic membrane 58 creates a local concentration of ozone layer 100 in the condensed water, thereby disinfecting it. Excess ozone not absorbed by the water is exhausted into the air stream where it would contribute to the disinfection and purification of the air stream flowing in the air channels 60.

It should now be appreciated that the practice of the present invention, in one embodiment, provides a system 10 for treatment and revitalization of air for astronauts operating in a zero gravity environment. The system 10 may also provide a revitalization of air that is used in home and office building air conditioning systems, airplane air systems, automotive air systems, room humidifiers, and room air cleaners.

The invention has been described with reference to preferred embodiments and alternates thereof. It is believed that many modifications and alterations to the embodiment as described herein will readily suggest themselves to those skilled in the art upon reading and understanding the detailed description of the invention. It is intended to include all modifications and alterations insofar as they come within the scope of the invention.

What I claim is:

1. A system for treating air, vapor, and water, said system comprising:
    a treatment chamber;
    a condenser located within the treatment chamber;
    an air inlet for introducing air and vapor into the condenser;
    an ozone generator for introducing ozone into the condenser to simultaneously ozonate the air, air vapor, and condensed water within the condenser;
    an air outlet for removing ozonated air immediately ready for human consumption from the condenser;
    a water outlet for removing ozonated water immediately ready for human consumption from the treatment chamber; and
    a hydrophilic membrane separating the air inlet and air outlet of the condenser from the water outlet.

2. The system according to claim 1, wherein the ozone generator is located at least partially within the condenser.

3. The system according to claim 2, wherein said ozone generator is of an electrochemical type consisting of a cathode, anode, and an ion exchange membrane spaced between and separating said cathode and said anode, said cathode and said anode capable of being respectively connected to a negative (−) and positive (+) potentials of a voltage source.

4. The system according to claim 3, wherein said cathode develops a reaction expressed as $$O_2 + 4e^- + 4H^+ \rightarrow 2H_2O,$$ and wherein said anode develops reactions expressed as:

$$3H_2O \rightarrow O_3(g) + 6e^- + 6H^+$$

$$O_2 + H_2O \rightarrow O_3(aq) + 2e^- + 2H^+$$

$$2H_2O \rightarrow O_2 + 4e^- + 4H^+.$$

5. The system according to claim 4, wherein the ozone generator is located on the hydrophilic membrane in communication with the air inlet and air outlet of the condenser.

6. The system according to claim 5, wherein the ozonated air withdrawn from the air outlet also includes ozonated vapor.

7. The system according to claim 6, wherein said hydrophilic membrane is of a plastic material having a medium grade of about 0.8μ, a thickness of about 0.0052 inches and a bubble point characteristic given in psid, of about 15.

8. A system for treating air, vapor, and water, said system comprising:
    a treatment chamber;
    a condenser located within the treatment chamber comprising a plurality of adjacent and interconnected air channels formed in a material of substantially high thermal conductivity and substantially low density, said plurality of air channels arranged over a hydrophilic membrane;
    an air inlet for introducing air and vapor into the condenser;
    an ozone generator for introducing ozone into the condenser channels to simultaneously ozonate the air, air vapor, and condensed water within the condenser;
    an air outlet for withdrawing treated air from the condenser; and
    a water outlet for withdrawing treated water ready for human consumption from the treatment chamber.

9. The system according to claim 8, wherein said material having said substantially high thermal conductivity and substantially low density is selected from the group consisting of aluminum, magnesium, titanium, metal filled or carbon filled plastics, and high thermal conductivity carbon composites.

10. The system according to claim 9, wherein said air channels are dimensioned to create radial accelerations of the flow therein.

11. The system according to claim 10, wherein said water outlet includes a suction apparatus comprising spring loaded bellows to assisting in the removal of treated water.

12. The system according to claim 11, further comprising a hydrophilic membrane separating the air inlet and air outlet from the water outlet.

13. The system according to claim 12, wherein the ozone generator is located at least partially within said condenser.

14. The system according to claim 13, wherein said ozone generator is of an electrochemical type consisting of a cathode, anode, and an ion exchange membrane spaced between and separating said cathode and said anode, said cathode and said anode capable of being respectively connected to a negative (−) and positive (+) potentials of a voltage source.

15. The system according to claim 14, wherein said cathode develops a reaction expressed as $O_2 + 4e^- + 4H^+ \rightarrow 2H_2O$, and wherein said anode develops reactions expressed as:

$3H_2O \rightarrow O_3(g) + 6e^- + 6H^+$ $O_2 + H_2O \rightarrow O_3(aq) + 2e^- + 2H^+$ $2H_2O \rightarrow O_2 + 4e + 4H^+$.

16. The system according to claim 15, wherein the ozone generator is located on the hydrophilic membrane in communication with the air inlet and air outlet.

17. The system according to claim 16, wherein the treated air withdrawn from the air outlet also includes treated vapor.

18. The system according to claim 17, wherein said hydrophilic membrane is of a plastic material having a medium grade of about 0.8μ, a thickness of about 0.0052 inches and a bubble point characteristic given in psid, of about 15.

* * * * *